(No Model.)
G. A. MUELLER.
FOIL REMOVING APPARATUS.
No. 606,154. Patented June 21, 1898.
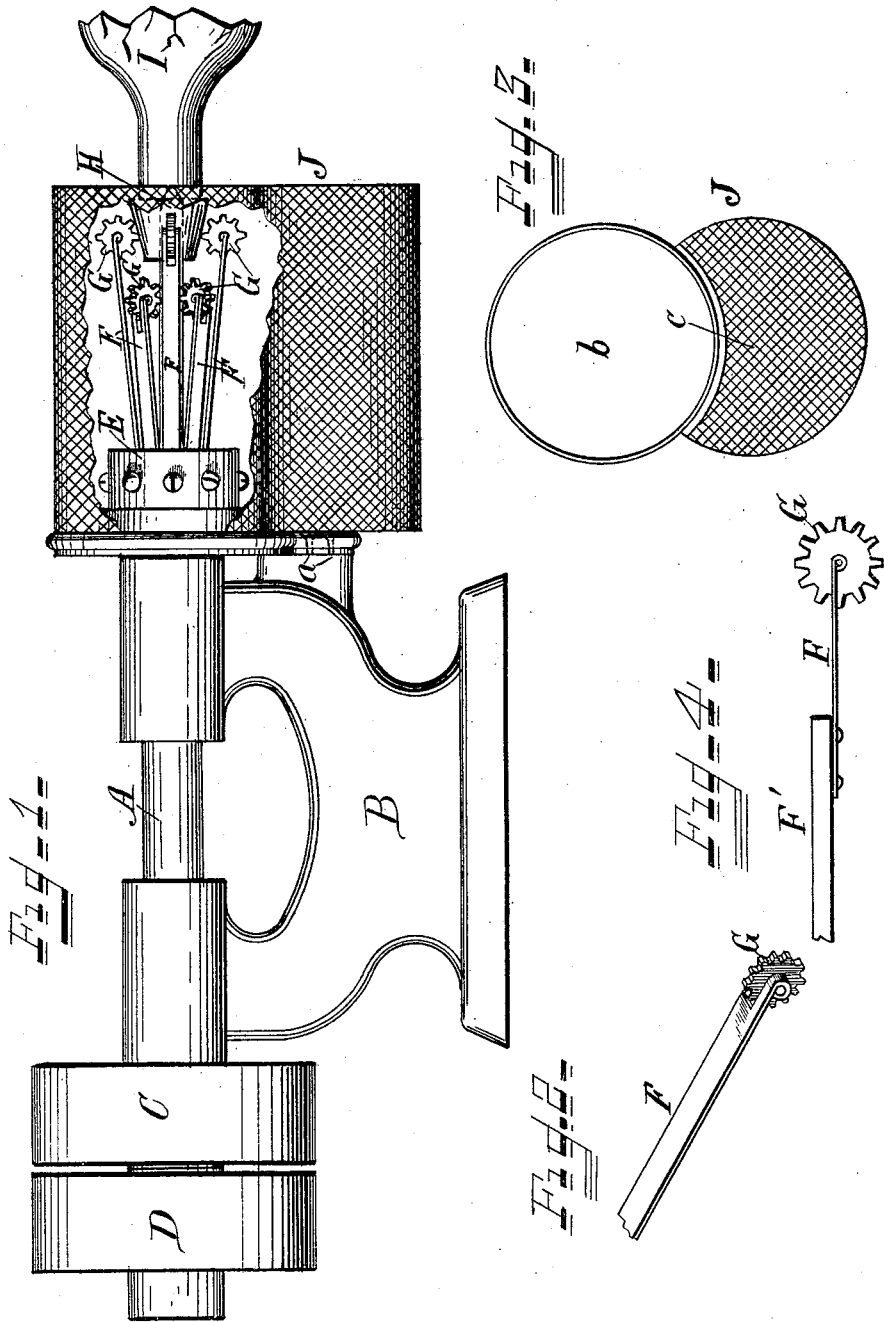
Witnesses.
William J. Peck
William A. Fay
Inventor.
George A. Mueller
by Chas M. Peck
his atty

UNITED STATES PATENT OFFICE.

GEORGE A. MUELLER, OF CINCINNATI, OHIO, ASSIGNOR, BY MESNE ASSIGNMENTS, TO YAWMAN & ERBE, OF ROCHESTER, NEW YORK.

FOIL-REMOVING APPARATUS.

SPECIFICATION forming part of Letters Patent No. 606,154, dated June 21, 1898.

Application filed February 19, 1896. Serial No. 579,841. (No model.)

*To all whom it may concern:*

Be it known that I, GEORGE A. MUELLER, a citizen of the United States, residing at Cincinnati, in the county of Hamilton and State of Ohio, have invented certain new and useful Improvements in Apparatus for Removing Foil from Bottles, of which the following is a full, clear, and exact description, reference being had to the accompanying drawings, forming part of this specification.

My invention relates to a novel apparatus for removing tin or gold foil or paper from the necks of bottles which have once been used when it is desired to cleanse them for refilling and further use; and it has for its object the production of simple and efficient means for doing this work in the most expeditious manner.

The novelty of my invention will be hereinafter set forth, and specifically pointed out in the claims.

In the accompanying drawings, Figure 1 is a side elevation, partly broken, of an apparatus embodying my invention. Fig. 2 is a partial perspective of one of the scrapers. Fig. 3 is a front elevation of the combined hood and foil-receptacle. Fig. 4 is a detail side elevation showing a modified form of attaching the scraping-wheels to rigid arms by spring connections.

The same letters of reference are used to indicate identical parts in all the figures.

Except in the particulars hereinafter pointed out, the machine is substantially constructed in accordance with my prior patent, No. 553,997, dated February 4, 1896; and it consists of a spindle A, suitably journaled in a stationary head B and carrying a fast driving-pulley C and a loose pulley D, with belt connection to a driving-shaft. Upon the projecting end of the spindle opposite the pulleys is secured in any suitable manner the near ends of forwardly-projecting bars or arms F, which are preferably flat springs, eight in number, and having pivoted to their forward ends toothed wheels G, whose planes are set substantially radial to the axis of the spindle. The teeth of these wheels, as seen in Fig. 2, are flattened on their outer periphery, after the manner of gear-teeth, and they are constructed, preferably, of chilled or tool steel.

These toothed wheels constitute the scrapers for removing the foil, and they are set equidistantly apart on the circle passing through their pivots and half of them are set back in alternating arrangement some distance between the outer ones and the head disk E.

Projecting centrally from the head E and in axial alinement with the spindle A is a rod H, extending slightly beyond the outmost wheels G and serving as a guide for the neck of the bottle I, which is slipped over it and pressed inward, so that the wheels G, which are rotated rapidly by the spindle A, pass over the outside of the neck of the bottle and are partially turned on their axes to follow all irregularities, as in going around the abrupt shoulders or "bead" on the neck of the bottle, and with the flattened edges of the teeth effectually remove all the foil or paper adhering thereto. This is a distinct improvement over my prior patent, before referred to, for the scraping edges are being constantly changed and the liability to wear is reduced to a minimum. Should the wheels, however, become worn by long use, they can easily be replaced by new ones without even the necessity of removing their carrying-arms.

While I prefer to make the arms F springs and to pivot the scraping-wheels directly thereto, it is evident that these arms may be rigid and that the scraping-wheels may be pivoted to springs or yielding members attached to these arms, as seen in Fig. 4, where F' is the rigid arm and F the spring secured thereto and carrying the scraping-wheel G.

The remaining feature of my invention consists in applying a hood and foil-collecting receptacle J to the stationary head B, and the only requisites of this hood are that it shall be removably attached to the head B, as by screws *a*, Fig. 1, and shall surround the arms G and scraping-wheels with an open end *b*, Fig. 3, for the proper introduction of the neck of the bottle to the action of the scraping-wheels and which shall be transparent to enable the operator to see the action of the scraping-wheels, and which shall carry below a compartment or receptacle *c* to collect the foil removed from the bottle-necks. I have found that a hood of this character constructed of wire-gauze or perforated sheet metal answers the purpose admirably, both for protecting the eyes of the operator from the removed foil and at the same time enabling him to see that the scrapers are acting properly and also as a receptacle for collecting the removed foil. When the receptacle becomes filled, the hood can be readily removed, the receptacle emptied, and then be replaced.

Having thus fully described my invention, I claim—

1. In a bottle-neck-scraping apparatus, the combination with a revolving head, of a pivoted and yielding series of toothed scraping-wheels carried thereby, substantially as described.

2. In a bottle-neck-scraping apparatus, the combination of a revolving head, of a series of yielding metal bars, and toothed scraping-wheels pivoted at the ends of the bars, substantially as described.

3. In a bottle-neck-scraping apparatus, the combination of a frame, a revolving head therein, yielding scrapers carried thereby, and a hood secured to the frame and surrounding the scrapers, substantially as described.

4. In a bottle-neck-scraping apparatus, the combination of a frame, a revolving head therein, yielding scrapers carried thereby, and a combined hood and receptacle, the former surrounding the scrapers, substantially as described.

5. In a bottle-neck-scraping apparatus, the combination of a frame, a revolving head therein, yielding scrapers carried thereby, a transparent hood surrounding the scrapers and a foil-receptacle beneath the scrapers, substantially as described.

GEO. A. MUELLER.

Witnesses:
J. THOMSON CROSS,
WILLIAM J. PECK.